United States Patent
Tokarski

(10) Patent No.: US 6,241,646 B1
(45) Date of Patent: *Jun. 5, 2001

(54) TEAR-AWAY CONTAINER SPOUT

(75) Inventor: Michael G. Tokarski, Dublin, OH (US)

(73) Assignee: SIG Combibloc Inc., Columbus, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/020,439

(22) Filed: Feb. 9, 1998

(51) Int. Cl.[7] ........................................ B31B 1/25
(52) U.S. Cl. .............................. 493/59; 493/87; 53/133.7
(58) Field of Search .................... 493/51, 59, 87; 53/133.6, 133.7, 133.8

(56) References Cited

U.S. PATENT DOCUMENTS

| 3,347,444 | 10/1967 | Rausing et al. ................ 229/216 |
|---|---|---|
| 3,909,582 | 9/1975 | Bowan ............................. 229/237 |
| 4,239,150 | 12/1980 | Schadowski et al. .......... 229/48 R |
| 4,254,693 | 3/1981 | Schadowski et al. ............ 493/60 |
| 4,301,927 | 11/1981 | Carlsson et al. ................ 229/216 |
| 4,367,828 | 1/1983 | Reil .................................. 229/216 |
| 4,591,091 | 5/1986 | Wise ................................ 229/206 |
| 4,655,387 | 4/1987 | Magnusson ..................... 229/216 |
| 4,666,044 | 5/1987 | Farber ............................. 229/237 |
| 4,703,876 | 11/1987 | Reil .................................. 229/216 |
| 4,915,236 | 4/1990 | Kamin et al. ................ 229/125.42 |
| 4,915,290 | 4/1990 | Robichaud et al. ......... 229/125.08 |
| 4,925,034 | 5/1990 | Robichaud et al. ............... 206/603 |
| 4,934,590 | 6/1990 | Robichaud et al. ......... 229/125.09 |
| 5,101,999 | 4/1992 | Robichaud et al. ............... 220/258 |
| 5,188,285 | 2/1993 | Nilsson et al. .................... 229/242 |
| 5,306,533 | 4/1994 | Robichaud et al. ............. 428/34.2 |
| 5,315,923 | 5/1994 | Tokarski et al. .................... 100/39 |
| 5,392,589 | * 2/1995 | Buchanan ......................... 53/133.7 |
| 5,430,589 | 7/1995 | Lane et al. ......................... 53/133.8 |
| 5,430,987 | * 7/1995 | Lane, Jr. et al. .................. 53/133.8 |
| 5,470,016 | 11/1995 | Ljungstrom et al. ............... 229/237 |
| 5,630,308 | * 5/1997 | Guckenberger .................... 53/412 |
| 5,639,018 | 6/1997 | Tokarski et al. ............. 229/125.04 |
| 5,688,463 | 11/1997 | Robichaud et al. ............... 264/400 |

FOREIGN PATENT DOCUMENTS

| 179240 | 4/1986 | (EP) . |
|---|---|---|
| 63-307028 | 12/1988 | (JP) . |
| 0307028 | * 12/1988 | (JP) ........................................ 493/87 |
| 6600713 | 8/1986 | (NL) . |

* cited by examiner

*Primary Examiner*—Eugene Kim
(74) *Attorney, Agent, or Firm*—Standley & Gilcrest LLP

(57) ABSTRACT

The present invention is directed to a method of using a laser to manufacture a container that has a tear-away spout. First, a flat card is formed by providing an outer substrate layer and then securing an inner aseptic layer to the outer substrate layer. After the flat card is formed, a cut of predetermined depth is made with a laser along a predetermined path in the outer substrate layer so that the cut does not puncture the inner aseptic layer. After the cut is made in the outer substrate layer, the flat card is folded to form a container that has a flap. The cut extends around the flap, and the flap has a tip. In order to form a spout, the tip is torn off at the cut.

16 Claims, 5 Drawing Sheets

TEAR-AWAY CONTAINER SPOUT

BACKGROUND AND SUMMARY OF THE INVENTION

The present invention relates generally to a method for manufacturing a container having a tear-away spout, and more particularly, to a method for manufacturing a sealed aseptic container having a tear-away spout. Sealed aseptic containers do not support the growth of living microorganisms. As a result, sealed aseptic containers may provide a shelf life of greater than one year without the use of preservatives or refrigeration.

Sealed aseptic containers are commonly used for packaging and transporting products that are sensitive to oxygen and/or light. Accordingly, sealed aseptic containers may be used for beverages such as juice and wine. In addition, sealed aseptic containers may be used for other liquid or semi-liquid foodstuffs such as gravy that quickly deteriorate after exposure to oxygen or light.

In order to provide access to the enclosed beverage or food, sealed aseptic containers may have an opening facilitator. Known opening facilitators include caps, flip-top lids, depressable push tabs, and straw holes. However, these opening facilitators are not cost-effective. In particular, these opening facilitators typically require extraneous components that must be attached to the container by means such as adhesives. Moreover, these opening facilitators do not efficiently deliver mass quantities of the food or beverage.

In order to address these shortcomings, tear-away spouts have been advanced. Nevertheless, known tear-away spouts have not been effective. In order to form known tear-away spouts, a mechanical means is used to cut the outline of the spout in the outer substrate layer of a flat card before the flat card is folded into the container. However, the mechanical means does not precisely cut the outer substrate layer, and the mechanical means runs the risk of puncturing the inner aseptic layer. Moreover, mechanical cutting means typically can only make curved corners. Therefore, a need exists for a method of manufacturing a spout in which the outer substrate layer is precisely cut and the inner aseptic layer is not punctured.

The present invention is designed to meet these objectives. The present invention is a method of using a laser to manufacture a container that has a tear-away spout. First, a flat card is formed by providing an outer substrate layer and then securing an inner aseptic layer to the outer substrate layer. After the flat card is formed, a cut of predetermined depth is made with a laser along a predetermined path in the outer substrate layer so that the cut does not puncture the inner aseptic layer.

After the cut is made in the outer substrate layer, the flat card is folded to form a container that has a flap. The cut extends around the flap, and the flap has a tip. In order to form a spout, the tip is simply torn off at the cut.

In addition to the novel features and advantages mentioned above, other objects and advantages of the present invention will be readily apparent from the following descriptions of the drawings and preferred embodiments.

DETAILED DESCRIPTION OF PREFERRED EMBODIMENT(S)

Figure 1:
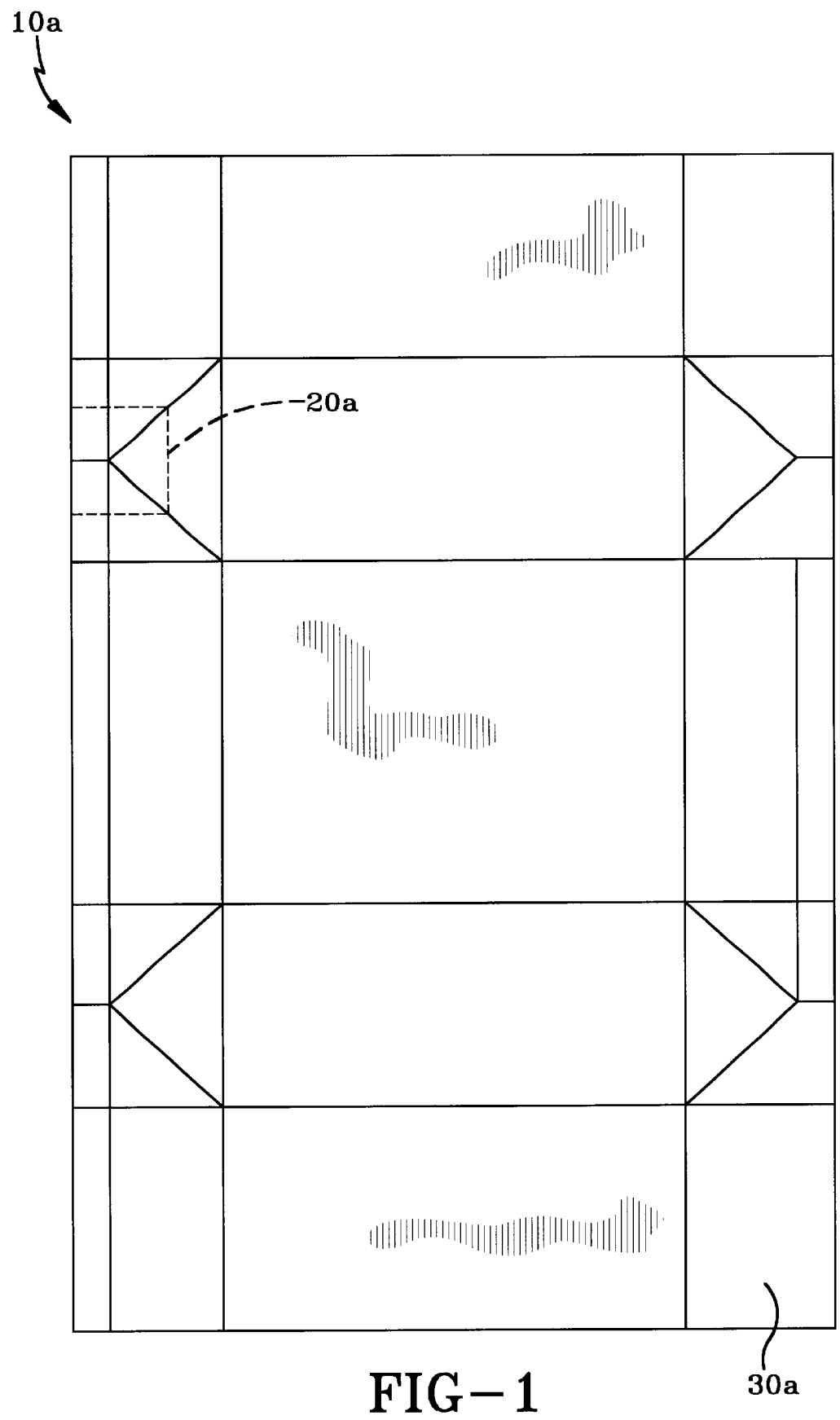
FIG. 1 is an outer plan view of a preferred embodiment of a flat card used in a preferred method of the present invention.

The present invention is directed to a method of using a laser to manufacture a container that has a tear-away spout. In general, a preferred embodiment of a container manufactured by a preferred method of the present invention includes an outer substrate layer, an inner aseptic layer, a cut, and a flap. In addition, the container preferably includes other layers such as those taught by U.S. Pat. No. 5,306,533, the disclosure of which is hereby incorporated by reference. However, the other layers are not pertinent to the description of the method of the present invention. Therefore, the other layers are not described or shown in the figures.

In a preferred embodiment of a container manufactured by a preferred method of the present invention, the outer substrate layer includes a substrate such as a layer of paperboard. However, it should be recognized that a preferred method of the present invention may work with other suitable substrate materials. In addition, the thickness of the substrate may vary depending on the application for the container.

On the other hand, a preferred embodiment of the inner aseptic layer may include any material that impedes the deterioration of the product in the container. Since exposure to oxygen may accelerate the deterioration of the product, the inner aseptic layer preferably includes an oxygen barrier layer which substantially prevents the transmission of oxygen through the container. Similarly, a product may be sensitive to exposure to light. Accordingly, the inner aseptic layer may also include a photic barrier layer which substantially controls light transmission through the container.

A preferred method of the present invention utilizes a flat card. The flat card is formed by providing an outer substrate layer and then securing an inner aseptic layer to the outer substrate layer. After the flat card is formed, a cut of predetermined depth is made with a laser along a predetermined path in the outer substrate layer so that the cut does not puncture the inner aseptic layer. The flat card may have creases which facilitate its transition into a container. While the cut may intersect the creases, it is preferred that the path of the cut does not run directly on any of the creases.

A preferred process for laser treating material is disclosed in U.S. Pat. No. 5,688,463, the disclosure of which is hereby incorporated by reference. The cut may be of any type that enables a user to form the tear-away spout. However, it is preferred that the cut is a perforated cut or a scored cut. In addition, it is preferred that the cut does not compromise the aseptic quality of the inner aseptic layer.

After the cut is made in the outer substrate layer, the flat card is folded to form a container that has a flap. In one preferred method of folding a flat card into a container that has a flap, the flat card is first formed into a sleeve. An end of the sleeve is then folded to form the bottom of the container. After the bottom of the container is formed, the interior of the container is preferably sterilized. A product which is preferably sterilized may then be deposited in the container through the open end of the sleeve. Once the product has been deposited, the open end of the sleeve may be folded to form the top and the flap of the container. The cut extends around the flap, and the flap has a tip.

The spout may be formed by tearing off the tip at the cut. A user may tear off the tip by first extending the flap from the side of the container. Next, the user may grasp the tip and flex the flap at the cut. After flexing the flap at the cut, the user may tear off the tip at the cut. The user may then apply slight pressure to the sides of the container in order to obtain an optimum opening of the spout.

In order to facilitate the removal of the tip, it is preferred that the portion of the cut on the outside of the flap is substantially collinear with the portion of the cut on the inside of the flap. In other words, it is preferred that the portion of the cut on the outside of the flap is substantially on top of the portion of the cut on the inside of the flap. By making a cut which is substantially collinear, a relatively simple tearing motion may be made to remove the tip at the cut.

FIG. 1 illustrates a preferred embodiment of a flat card which may be used in the method of the present invention. The flat card 10a has a cut 20a in the outer substrate layer 30a. As shown, the cut 20a is made along a predetermined path so that it will extend around the flap when the flat card 10a is folded into a container.

Figure 2:
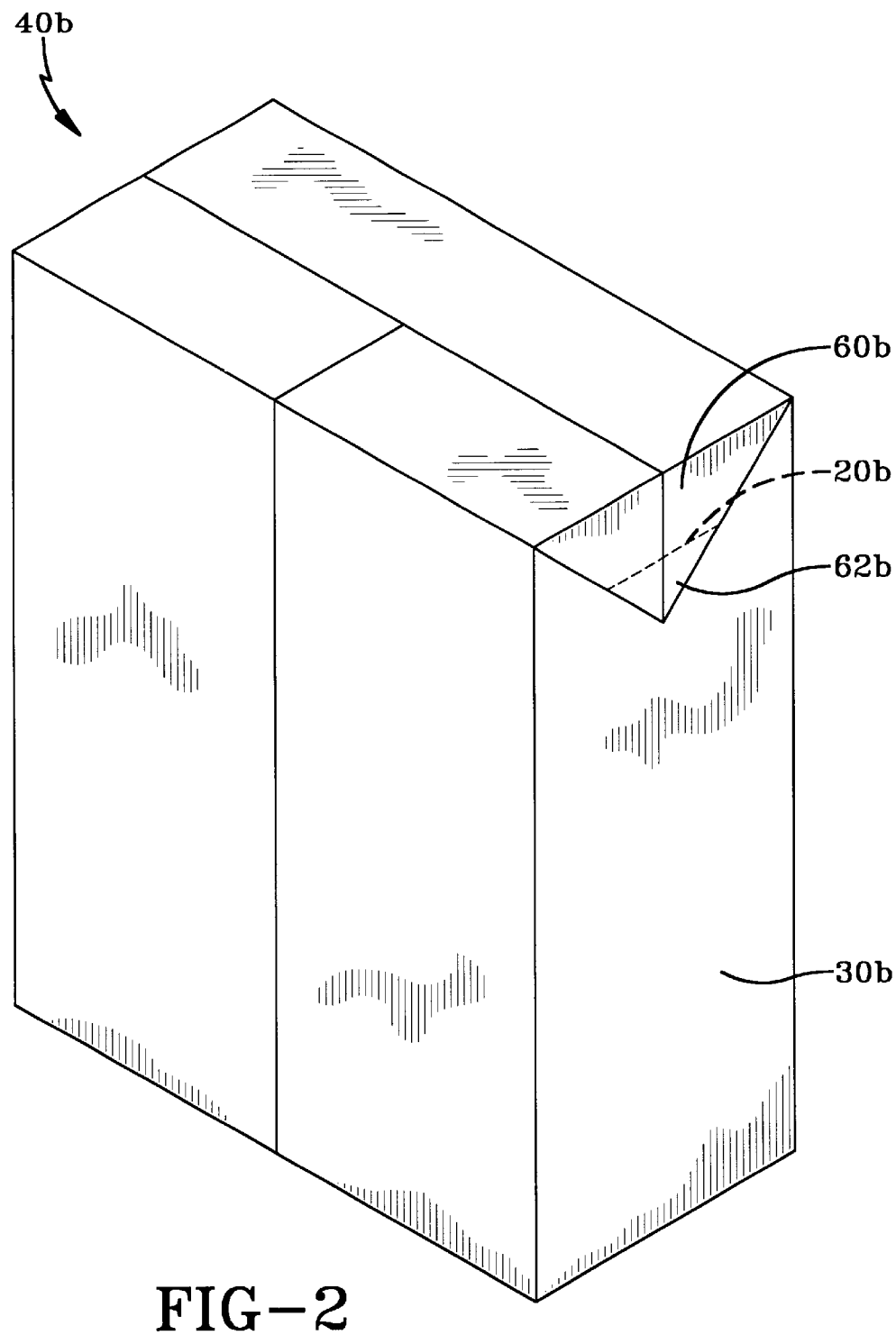
FIG. 2 is a perspective view of a preferred embodiment of a container manufactured by a preferred method of the present invention.
Figure 3:
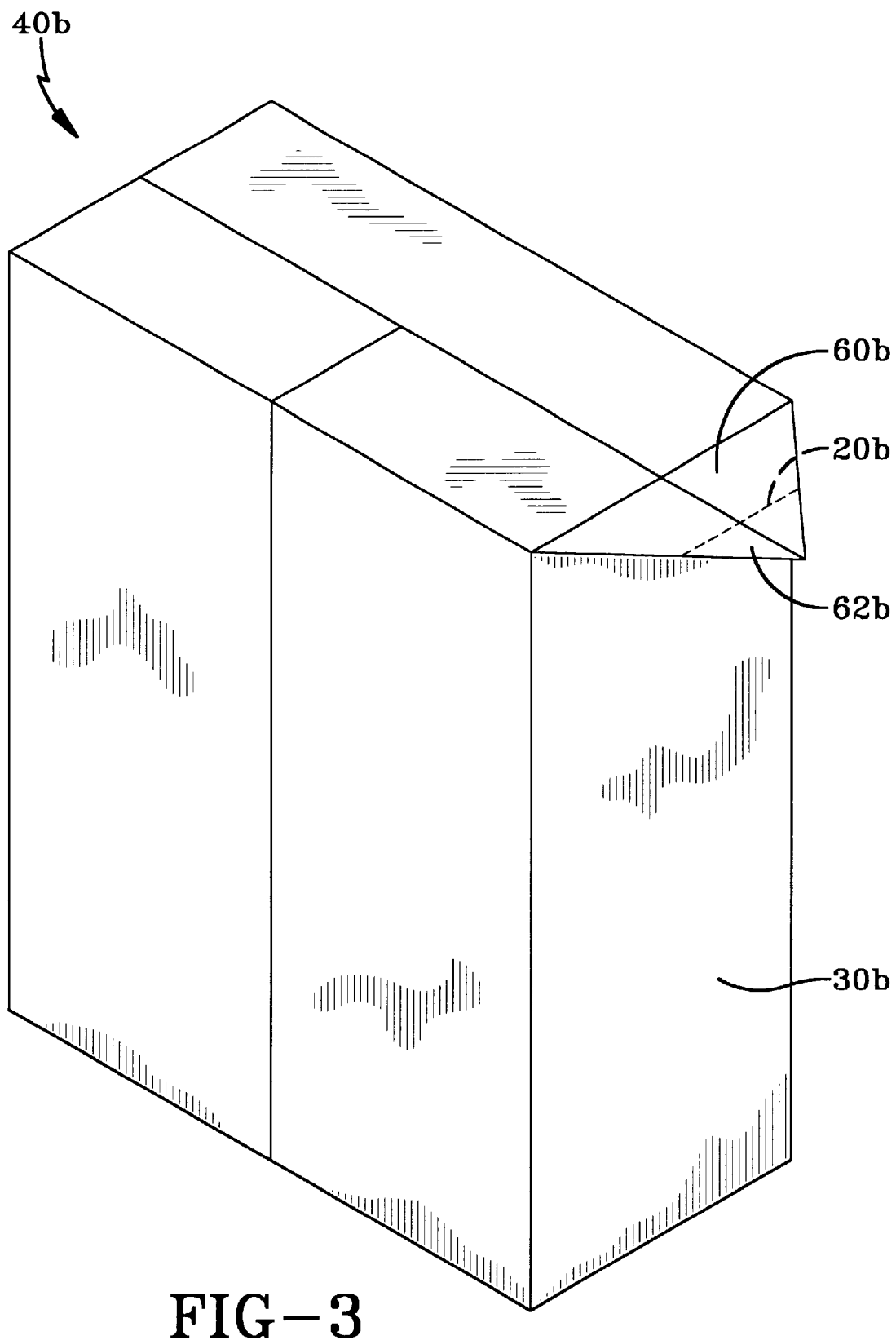
FIG. 3 is a perspective view of the container shown in FIG. 2 with the flap extended.
Figure 4:
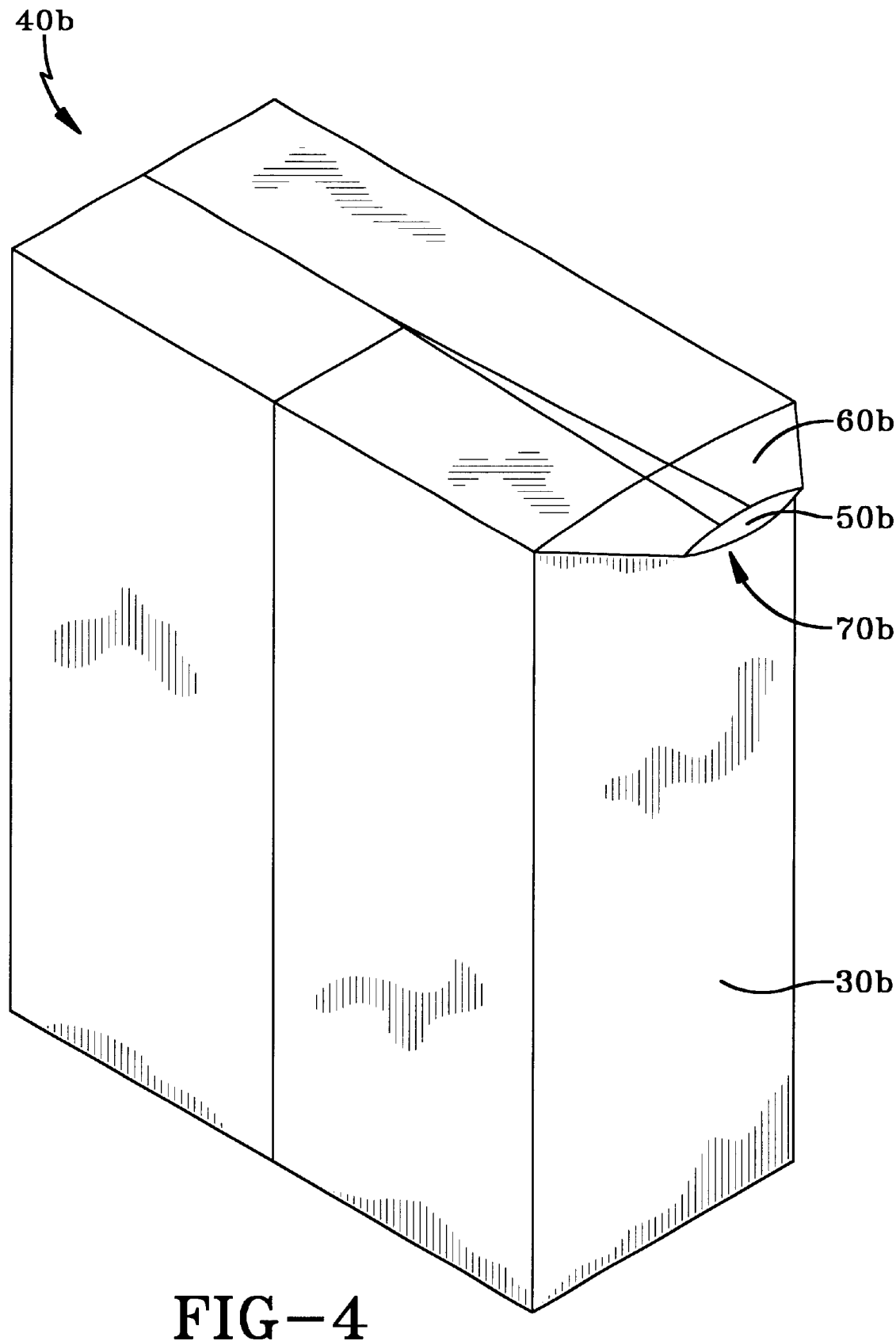
FIG. 4 is a perspective view of the container shown in FIG. 2 after the tip has been torn off to form a spout.

FIGS. 2 through 4 show a preferred embodiment of a container manufactured by a preferred method of the present invention. The container 40b has a cut 20b, an outer substrate layer 30b, an inner aseptic layer 50b, a flap 60b, a tip 62b, and a spout 70b. FIG. 2 shows the container 40b with the flap 60b in a down position. In FIG. 3, the flap 60b has been extended from the side of the container 40b. FIG. 4 illustrates the spout 70b which has been formed by tearing off the tip 62b and then applying slight pressure to the sides of the container 40b.

The cut may be made by any laser system which may cause the local evaporation of material from the flat card. As opposed to mechanical cutting means, a laser can typically make tear lines which are more precise, which are easier to sever, and which require less force to sever. In particular, a benefit of using a laser system is that right angle cuts or incisions may be made without rotating the flat card. Conversely, mechanical cutting means typically can only make curved corners. Depending on the type of force applied to the tip of the flap, a cut having right angles may facilitate the removal of the tip from the flap.

Figure 5:
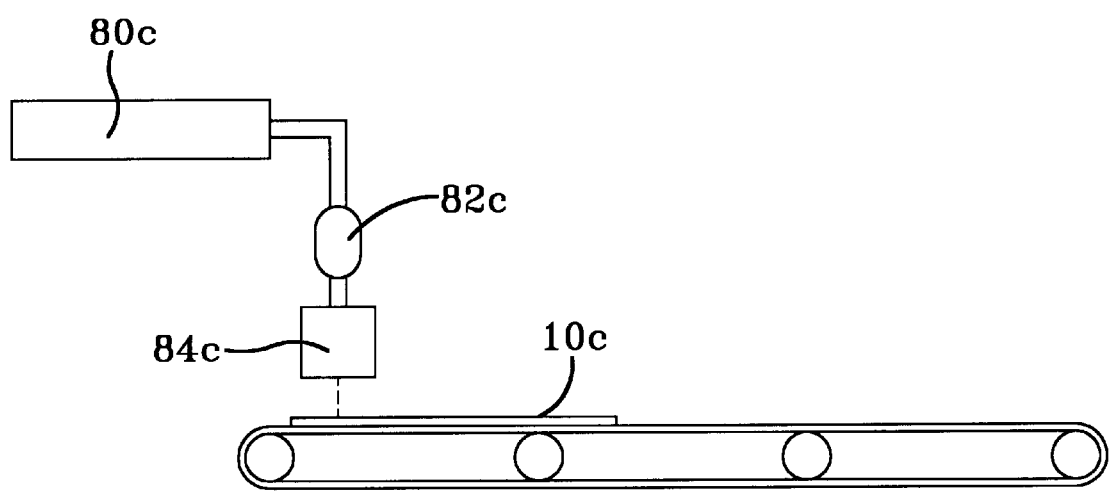
FIG. 5 is a schematic view of a preferred embodiment of a laser system which may be used to make the cut in the outer substrate layer.

FIG. 5 illustrates a preferred embodiment of a laser system which may be used to make the cut. As shown in FIG. 5, the laser 80c may generate a laser beam and supply it to a z-axis focus 82c. The laser beam may then travel through a two-axis laser galvo 84c which may comprise X and Y-axis positioning mirrors. The laser beam may then be guided through its desired pattern on the flat card 10c.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A method for manufacturing a container having a tear-away spout, said method comprising the steps of:
   providing an outer substrate layer;
   securing an inner aseptic layer to said outer substrate layer;
   making a cut of predetermined depth with a laser along a predetermined path in said outer substrate layer such that said cut does not puncture said inner aseptic layer; and
   forming a container having a flap, said flap having a tip and opposing sides such that said cut extends around said opposing sides and generally encircles said flap;
   whereby said tip is adapted to be grasped and torn off along said cut in order to form a spout.

2. The method of claim 1 wherein said inner aseptic layer includes an oxygen barrier layer which substantially prevents the transmission of oxygen through said container.

3. The method of claim 1 wherein said inner aseptic layer includes a photic barrier layer which substantially controls light transmission through said container.

4. The method of claim 1 wherein said cut does not compromise the aseptic quality of said inner aseptic layer.

5. The method of claim 1 wherein said cut is a perforated cut.

6. The method of claim 1 wherein said cut is a scored cut.

7. The method of claim 1 wherein said outer substrate layer includes a paperboard layer.

8. The method of claim 1 wherein said cut is substantially collinear.

9. A method for manufacturing a container which holds a product, said container having a bottom, a top, and a flap, said flap having opposing sides and a tip which may be grasped and torn off to form a spout, said method comprising the steps of:
   providing an outer substrate layer;
   securing an inner aseptic layer to said outer substrate layer;
   making a cut of predetermined depth with a laser along a predetermined path in said outer substrate layer such that said cut does not puncture said inner aseptic layer;
   forming a sleeve;
   forming said bottom of said container;
   filling said container with a predetermined amount of said product; and
   forming said top and said flap of said container such that said cut extends around said opposing sides and generally encircles said flap;
   whereby said tip is adapted to be grasped and torn off along said cut in order to form a spout.

10. The method of claim 9 wherein said inner aseptic layer includes an oxygen barrier layer which substantially prevents the transmission of oxygen through said container.

11. The method of claim 9 wherein said inner aseptic layer includes a photic barrier layer which substantially controls light transmission through said container.

12. The method of claim 9 wherein said cut does not compromise the aseptic quality of said inner aseptic layer.

13. The method of claim 9 wherein said outer substrate layer includes a paperboard layer.

14. The method of claim 9 wherein said cut is substantially collinear.

15. The method of claim 9 wherein said cut is a perforated cut.

16. The method of claim 9 wherein said cut is a scored cut.

* * * * *